Feb. 9, 1971    A. R. BAKER    3,561,205
FRUIT HARVESTER
Filed June 6, 1968    4 Sheets-Sheet 1

Alfred R. Baker
INVENTOR.

BY Clarence A. O'Brien
and Harvey B. Jacobson
Attorneys

Feb. 9, 1971 A. R. BAKER 3,561,205
FRUIT HARVESTER
Filed June 6, 1968 4 Sheets-Sheet 2
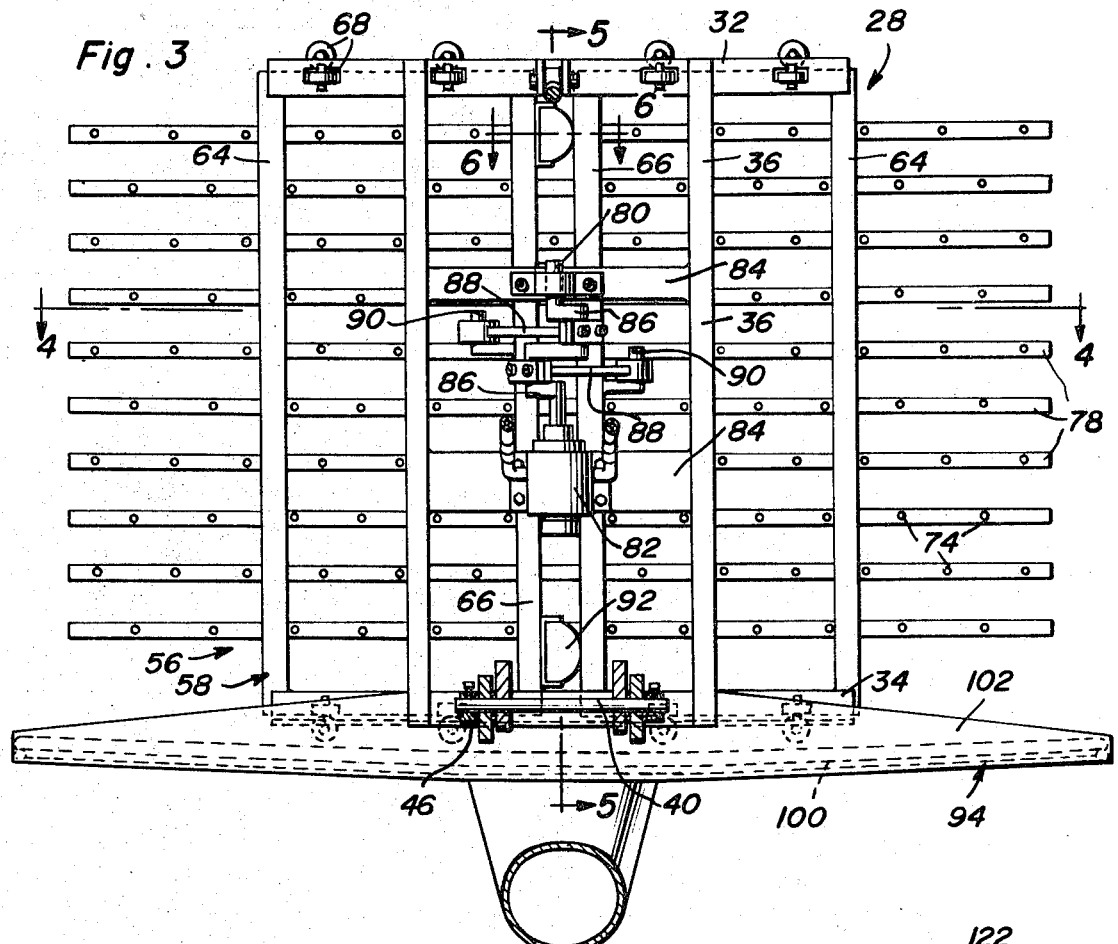
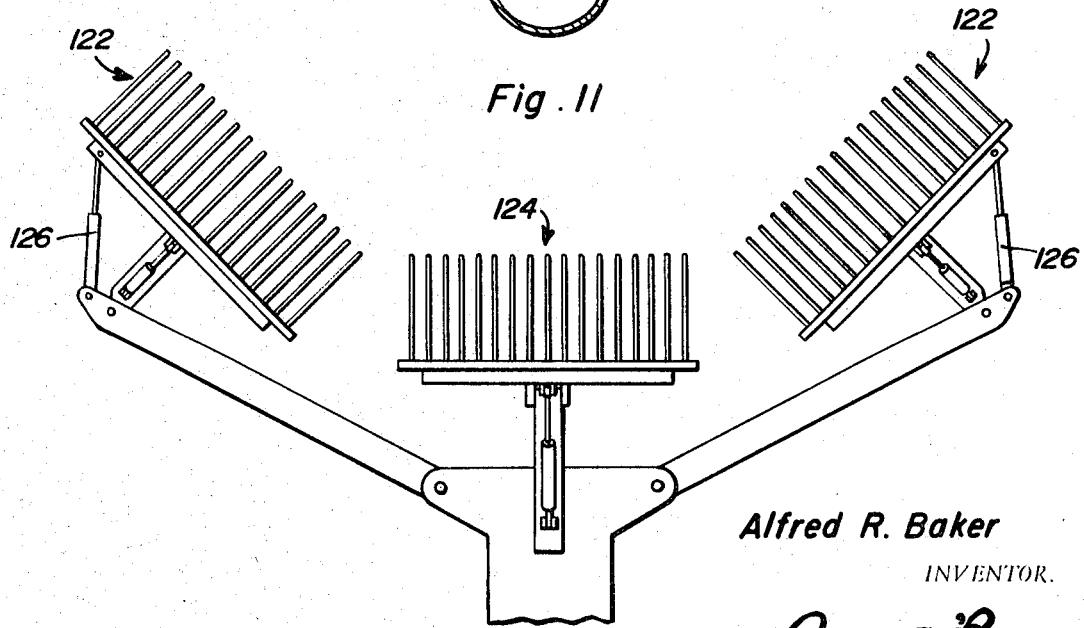
Alfred R. Baker
*INVENTOR.*

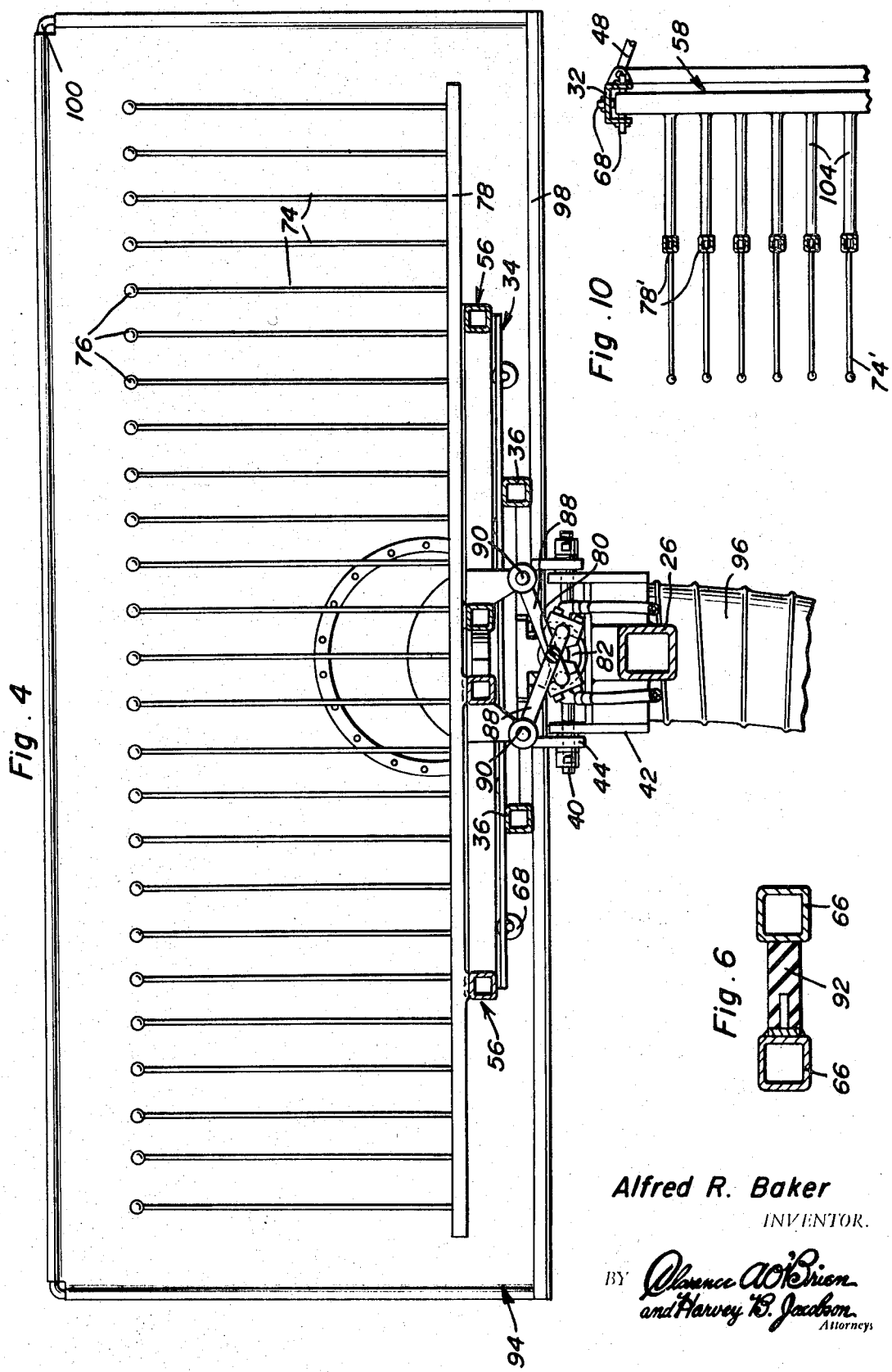

Feb. 9, 1971  A. R. BAKER  3,561,205
FRUIT HARVESTER
Filed June 6, 1968  4 Sheets-Sheet 4
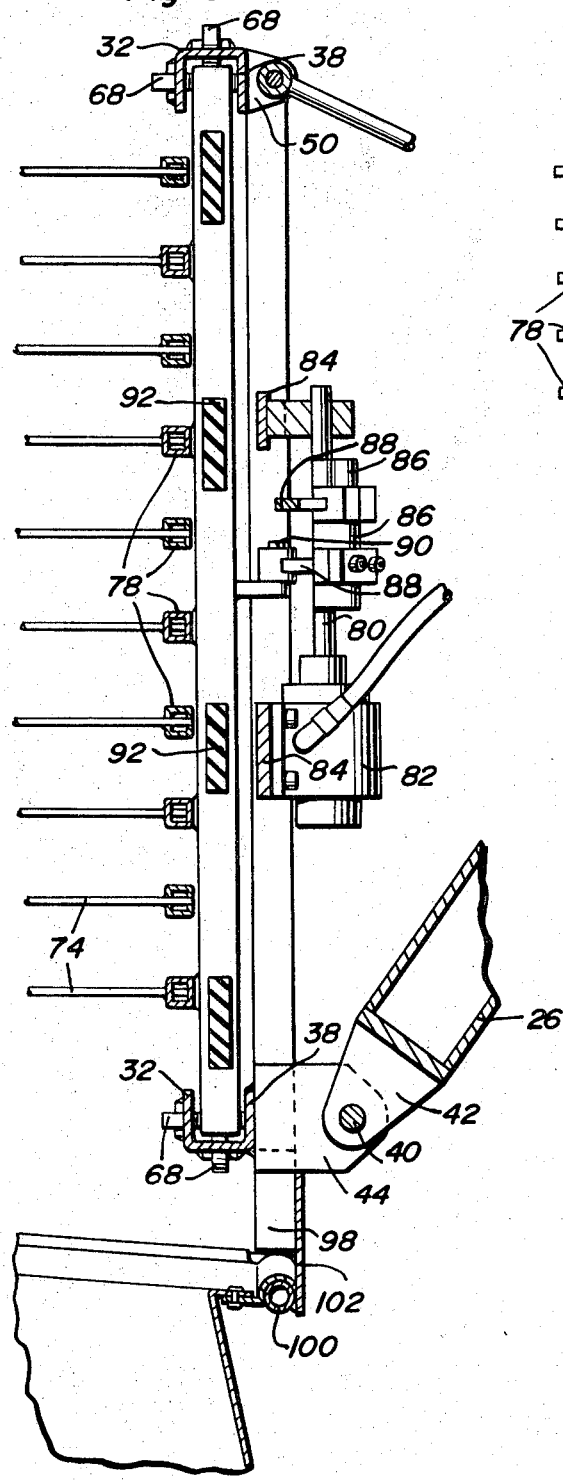
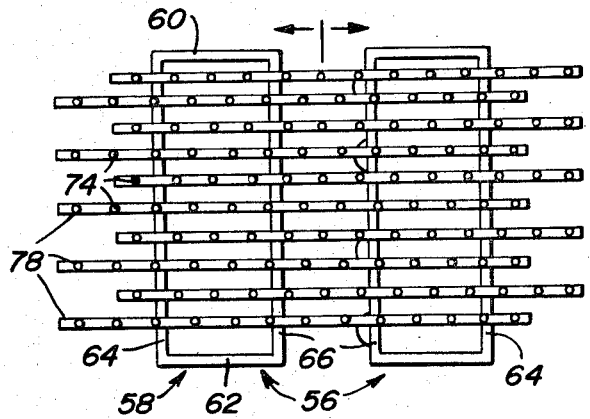
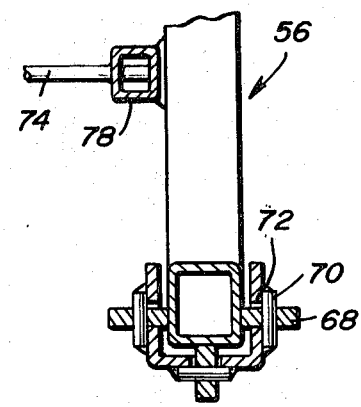
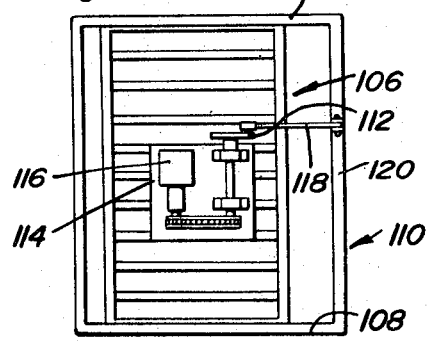
Alfred R. Baker
INVENTOR.
BY Clarence A. O'Brien
and Harvey B. Jackson
Attorneys

United States Patent Office 3,561,205
Patented Feb. 9, 1971

3,561,205
FRUIT HARVESTER
Alfred R. Baker, Wabasso, Fla.
(1408½ Edmiston Court, Auburndale, Fla. 33823)
Filed June 6, 1968, Ser. No. 735,116
Int. Cl. A01g 19/04, 19/08
U.S. Cl. 56—328    11 Claims

ABSTRACT OF THE DISCLOSURE

A horizontally and vertically adjustable boom mounted picking head formed of a series of projecting rodlike fingers which are progressively penetrated to increasing depths within a fruit tree and laterally reciprocated at the different depths of penetration in a manner so as to snap the fruit stems and allow for a fall of the fruit through the pattern formed by the rods and into a fruit gathering apparatus.

---

The instant invention is generally concerned with the harvesting of fruit, and more particularly relates to a device which effects a severing of the fruit from a tree through a penetration of the tree and a reciprocal movement of elongated rodlike members so as to effect a snapping of the fruit stems, the machine also being provided with an underlying fruit gathering structure.

It is a primary object of the instant invention to provide a fruit harvester which can be effectively utilized to remove matured fruit while leaving the green fruit, or that fruit not yet matured, in a manner which does not damage the tree, crush the fruit, or damage the next crop.

The harvester is adapted for mounting on any appropriate vehicle, such as a tractor, having a hydraulic supply system. The actual picking head will be supported on the end of a boom through which the desired positioning of the head can be effected. The head itself includes a plurality of tree penetrating rods mounted thereon in a predetermined pattern formed so as to best accommodate the particular fruit being picked. The head, as a unit, is horizontally reciprocated for a very short time so as to effect, through the rods, a breaking of the fruit stems, after which the movement of the head is stopped and the fruit allowed to fall therethrough onto a subjacent gathering pan. Finally, the picking head can actually consist of two adjacent units, the operation of which is synchronized so as to effect a more efficient movement of the stem severing rods.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a rear elevational view of the picking head portion taken substantially on a plane passing along line 3—3 in FIG. 1;

FIG. 4 is a horizontal cross-sectional view taken substantially on a plane passing along line 4—4 in FIG. 3;

FIG. 5 is an enlarged vertical cross-sectional view taken substantially on a plane passing along line 5—5 in FIG. 3;

FIG. 6 is an enlarged cross-sectional detail taken substantially on a plane passing along line 6—6 in FIG. 3;

FIG. 7 is an enlarged cross-sectional detail taken substantially on a plane passing along line 7—7 in FIG. 2;

FIG. 8 is a reduced schematic front elevational view of the picking head illustrating the movement of the picking head sections;

FIG. 9 is a reduced rear elevational view of a slightly modified form of picking head;

FIG. 10 is a cross-sectional detail illustrating a modified form of rod mount for the picking head; and FIG. 11 schematically illustrates a modified form of the harvester wherein auxiliary side units are provided so as to generally encircle a substantial portion of a tree for a simultaneous removal of fruit therefrom.

Figure 1:
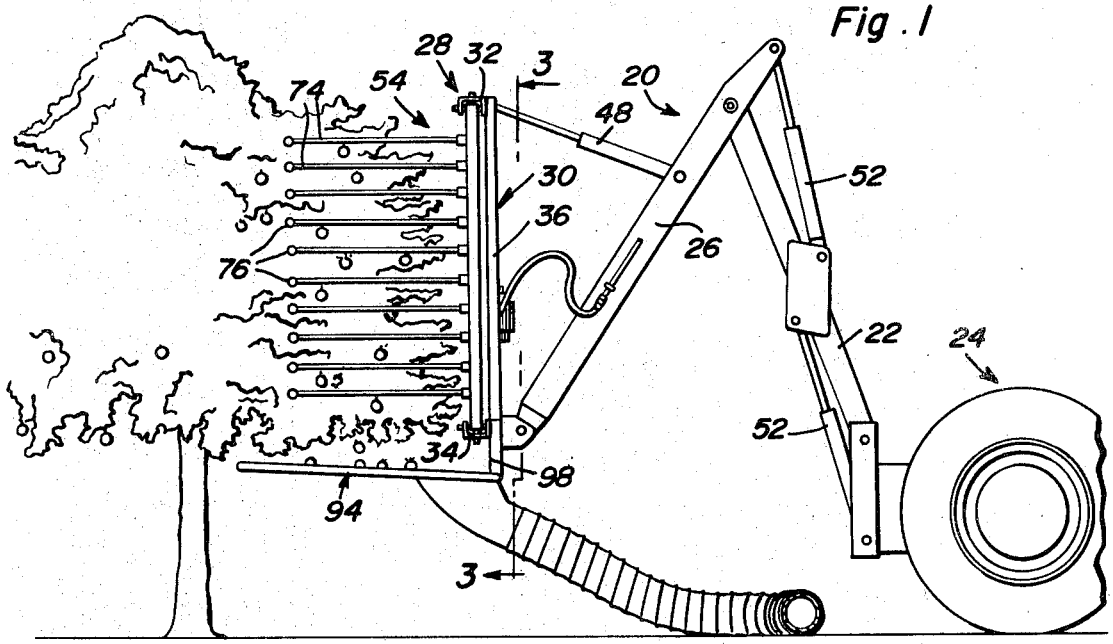
FIG. 1 is a side elevational view of the fruit harvester of the instant invention presented in operative position relative to a fruit tree.

Referring now more specifically to the drawings, reference numeral 20 is used to generally designate the fruit harvester comprising the instant invention. The harvester 20 is to include a hydraulically controlled boom 22 mountable upon a conventional tractor or the like 24 with the boom itself mounting a hydraulically controlled dipper stick 26.

The actual picking unit 28 includes a mounting frame 30 formed basically of upper and lower horizontally elongated channel shaped tracks 32 and 34 interconnected by a pair of laterally spaced rigid vertical members 36. The upper and lower tracks 32 and 34 open toward each other with the vertical frame members 36 being permanently affixed, as by welding, to the vertical rear flanges 38 of the tracks 32 and 34. The mounting frame 30 is pivotally affixed to the free outer end of the dipper stick 26 by means of a transverse pivot pin 40 extending through a pair of ears 42 on the end of the dipper stick 26 and a pair of similar rearwardly directed ears 44 rigid with the lower central portion of the mounting frame 30 and projecting rearwardly therefrom. Appropriate lock collars 46, noting FIG. 3, can be used as required so as to fix the position of the shaft 40. The actual vertical orientation of the mounting frame 30, about the pivotally mounted lower end thereof, will be controlled by a hydraulically operated piston and cylinder unit 48 engaged between an intermediate portion of the dipper stick 26 and a central portion of the mounting frame at the top thereof, for example through a pair of mounting ears 50 welded to the upper track 32 and projecting rearwardly therefrom as detailed in FIG. 5. Incidently, it will of course be appreciated that additional hydraulic cylinder and piston units 52 are also utilized to effect a controlled movement of the boom 22 and dipper stick 26 so as to effect a variation in the height of the picking unit 28.

The picking head 54 itself normally consists of two picking sections 56. Each of these picking sections or picking head sections 56 includes a vertically elongated rectangular frame 58, preferably constructed of rigidly interconnected tubular upper and lower horizontal beams 60 and 62, and laterally spaced vertical tubular beams 64 and 66. Each of the picking head sections 56 is positioned within the opposed tracks 32 and 34 with the upper and lower frame beams 60 and 62 rollingly supported therein by a series of support rollers 68 projecting into the interior of the corresponding track through all three walls thereof at longitudinally spaced points therealong for rolling engagement with three sides of the received corresponding frame beam 60 or 62. These rollers can be rotatably mounted in any suitable manner, such as through short transversely extending shafts 70 welded directly to the corresponding track 32 or 34 and rotatably mounting the rollers 68 thereon with these rollers 68 extending into the interior of the corresponding track through enlaged openings 72 provided therein. It is believed that the manner of mounting of the rollers 68 as well as the rolling engagement thereof with the picking head beams 60 and 62 will be readily appreciated from FIGS. 5 and 7.

Figure 2:
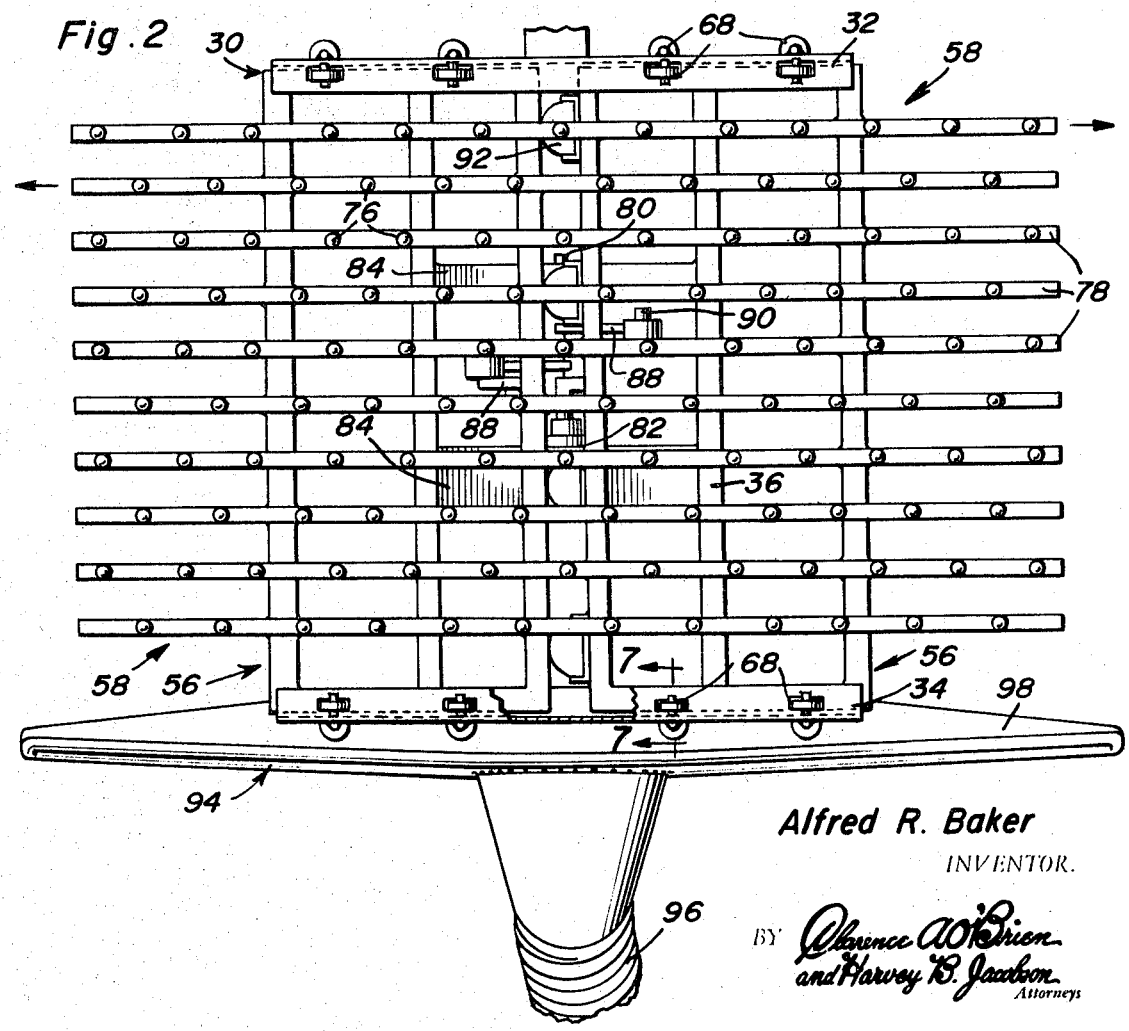
FIG. 2 is an enlarged front elevational view of the apparatus.

The actual picking operation is effected by means of a network of elongated cylindrical or tubular rods 74 affixed to the frame 58 of the picking head sections 56 and projecting forwardly therefrom, normally terminating in a bulbous forward end 76 so as to facilitate the penetration of the tree without damage to the tree or the fruit. The actual mounting of the rods 74 consists of a rigid fixing, as by welding, of the inner ends of the rods 74 to a plurality of vertically spaced horizontally elongated mounting bars 78 positioned transversely across the front of the mounting frames 58 and projecting laterally beyond both sides thereof. In the actual operation of the basic form of the invention, it is contemplated that the picking head sections 56, in a synchronized manner, reciprocate outwardly away from each other and subsequently inwardly toward each other with the adjacent rows of rods 74 moving in opposite directions as should be appreciated from a comparison of FIGS. 2 and 8. In order to effect the desired oppositely directed movement of the adjacent horizontal rows of the rods 74, the rod mounting bars 78 are alternately secured to the section frames 58 and at the same time alternately freely overlie the other section. In other words, every other mounting bar throughout the height of the picking head 54 is affixed to one of the section frames 58 while the other mounting bars are fixedly secured to the second frame 58. In this manner, the rods in each of the rows will move laterally in a direction opposed to that of the rods in the adjacent rows, this movement having been found to produce a highly effective severing of the fruit stems with little or no damage to the fruit itself or the tree.

The actual reciprocal driving of the picking head sections 56, facilitated by the roller mounting of the upper and lower ends thereof, is effected, noting FIG. 3, through the utilization of a crankshaft 80 rotatably driven from an appropriate, preferably hydraulic, motor 82. The shaft 80 and motor 82 are vertically orientated and mounted on suitable mounting plates 84 welded to and extending horizontally between the vertical members 36 of the mounting frame 30. The crankshaft 80 includes a pair of oppositely directed crank portions 86 thereon, each of which is engaged with one of the picking head sections 56 through an elongated rigid throw rod 88 pivotally connected at one end to the corresponding crank 86 and pivotally connected at the second end to a shaft portion 90 rigidly affixed to the corresponding section 56. Thus, as the crankshaft 80 is rotatably driven by the motor 82, the two sections 56 will sequentially move away from and toward each other; this in turn will of course provide the desired reciprocation of the fruit severing rods 74. If deeemed desirable, in order to cushion the movement of the sections 56 toward each other, appropriate elastomeric bumpers 92 can be mounted on the inner vertical frame member 66 of one of the frames 58 for engagement against the inner member 66 of the second frame 58.

In order to collect the fruit severed by the picking head 54, an enlarged collection tray or pan 94 is mounted generally horizontally below the picking head 54, this tray 94 being slightly inclined so as to gather the fruit falling thereon to a central discharge chute 96, preferably in the nature of a canvas tube, which moves the fruit to a loading point. The collection tray 94 will be supported directly from the mounting frame 30, for example by means of a transverse beam 98 affixed to the lower ends of the frame vertical members 36 and in turn supporting a lightweight tubular forwardly projecting tray frame 100 which supports the surface forming material of the tray, whether this be of sheet metal, rigid plastic or stretched canvas. With reference to FIG. 5, an appropriate backup plate 102 can also be utilized so as to assist in confining the fruit at the rear or lower end of the pan 94, as well as a means for assisting in the stabilized mounting of the tubular tray frame 102 to the support beam 98. Additional braces can of course be provided as required so as to properly support and orientate the pan 94 for the reception of the fruit freed from the tree by the reciprocating rods 74.

With reference to FIG. 10, such illustrates a modified form of rod support wherein the rod supporting mounting bars 78' are positioned in forwardly spaced relation to the picking head section frame 58 by means of rigid members 104 so as to either enable the use of shorter rods 74' so as to achieve a greater rigidity thereto, or so as to provide for a greater penetration of the tree. With the arrangement of FIG. 10, the mounting bars 78', being horizontally oriented, thereby do not interfere with the horizontal or reciprocal movement through which a severing of the fruit is effected.

Referring now specifically to FIG. 9, a modified form of picking unit has been illustrated therein. This picking unit consists of a single picking head section 106 mounted for horizontal sliding movement between upper and lower track forming beams 108 of a mounting frame 110. The reciprocal movement of the picking head 106 is effected through a shaft mounted eccentric 112 mounted, through a mounting platform 114, directly on the rear face of the picking head 106 along with the driving motor 116 itself. The throw rod 118 associated with the eccentric 112 extends from a pivotal engagement with the eccentric 112 laterally outward to pivotally engage one of the vertical side members 120 of the mounting frame 110. In this manner, as the accentric 112 is rotatably driven, the picking head 106, through the throw rod 118, is horizontally reciprocated relative to the rigid mounting frame 110, the mounting base 114 for the motor and eccentric riding along with the reciprocating picking head 106.

Finally, attention is directed to FIG. 11 wherein a multiple unit has been schematically illustrated, such consisting basically of auxiliary picking units 122 mounted laterally to each side of the main picking unit 124 and hydraulically adjusted, through suitable rams 126, for positioning into picking engagement with a tree to the opposite sides of the unit 124 whereby a larger area can be effectively accommodated. It will of course be appreciated that the auxiliarly units 122 are to operate in the manner described supra through individual hydraulic motors provided therewith.

In actual use, the fiuit harvester is positioned adjacent a tree, the picking unit elevated to the proper location, and introduced laterally into the tree for an initial penetration of approximately 1 and ½ feet. In this position, the picking head is reciprocally driven for a few seconds, such being considered sufficient so as to sever or snap the stems of the mature fruit. Once severed, the fuit falls through the picking fingers or rods onto the underlying collection tray or pan which in turn directs the fruit to the discharge chute. After the initial fall of fruit, the picking head is projected further into the tree and the reciprocating movement thereof and the subsequent collection of the fruit repeated. This sequence of steps continues until a maximum penetration of the tree is achieved. It should be appreciated that the actual arrangement and spacing of the picking rods or fingers can be varied so as to accommodate different types of fruit. Further, through a control of the speed and length of the reciprocating strokes, the machine can be conveniently set so as to effect a severing of the stems of the mature fruit while leaving the small green fruit which is not yet matured, the movement required to pick the larger ripe or mature fruit, as well as the associated speed, being insufficient to dislodge the unmatured or green fruit. Incidently, while two forms of picking heads, those of FIGS. 8 and 9, have been described specifically, it should be appreciated that variations of these forms are also contemplated within the scope of the instant invention. For example, with the use of two head sections as in FIG. 8, one of the sections can be maintained stationary while the second section is reciprocated relative thereto, thus in effect still providing the by-passing movement of the rods in the adjacent rows so as to effect an efficient severing of the fruit. Further, if so desired, the picking head can consist of two adjacent reciprocating sections wherein the rod mounting bars, rather than overlying the adjacent sections, are of a width equal only to the width of the particular section such as is the case with the single section form of FIG. 9. In all of these situations, it will be appreciated that the basic idea of providing for the lateral reciprocal movement of a plurality of elongated fingerlke rods for the purpose of severing mature fruit has been retained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fruit harvester comprising a rigid mounting frame, a picking head unit, means mounting said head unit on said mounting frame for reciprocal movement as a unit relative thereto, and means for reciprocally moving said head unit relative to said frame, said head unit including a plurality of spaced parallel rodlike picking fingers thereon, said picking fingers projecting laterally outward of said head unit relative to the direction of movement of the head unit, said head unit being generally vertically oriented and including upper and lower generally horizontal beams, vertical members rigidly interconnecting said beams, and transverse rigid bars mounted on and extending across said vertical members, said bars being oriented in parallel vertically spaced relation to each other, said fingers being rigidly affixed, at one end thereof, to said bars, the means mounting said head unit on said frame for reciprocal movement relative thereto comprising upper and lower tracks slidably receiving the upper and lower horizontal beams of said head unit, said upper and lower tracks constituting rigid portions of said mounting frame, and roller means associated with said tracks and rollingly engaged with said upper and lower beams for effecting a free movement of the head unit in said tracks, the means for reciprocally moving said head unit comprising a throw rod engaged between said head unit and said mounting frame and power means for effecting a selective extension and retraction of said throw rod so as to vary the position of the head unit relative to the fixed frame, and a second head unit duplicating the construction of the first head unit and mounted in spaced coplanar relation thereto and reciprocally moved in synchronization therewith.

2. The harvester of claim 1 wherein the finger carrying mounting bars of each head unit freely overlie the adjacent unit for movement thereacross in response to a reciprocal movement of the units.

3. The harvester of claim 2 wherein the mounting bars of each unit alternate with the mounting bars of the other unit.

4. The harvester of claim 3 including means pivotally mounting the lower portion of said mounting frame to a support, and means for angularly adjusting the mounting frame about the pivotal mounting thereof.

5. The harvester of claim 4 including an enlarged generally horizontally oriented fruit collecting pan underlying the picking head units and the rodlike picking fingers thereon for the reception of the picked fruit therefrom.

6. In a fruit harvester, a picking unit, said picking unit comprising a pair of generally vertical coplanar adjacent picking head sections, means for effecting a lateral movement of said head sections relative to each other and in the common plane thereof, each of said sections including rigid elongated generally horizontal mounting bars transversely thereacross, each of said mounting bars including a plurality of elongated rodlike picking fingers rigid therewith and projecting laterally therefrom for picking engagement with fruit upon the relative movement of the sections, the mounting bars associated with each section alternating in vertically spaced rows with the mounting bars of the other section, the mounting bars of each section extending into free overlying relation to the second section and mounting the projecting rodlike picking fingers along the full length thereof.

7. The construction of claim 6 including a rigid mounting frame slidably receiving said sections, said means for moving said sections relative to each other comprising a motor mounted on said frame generally between said sections, an eccentric shaft rotatably drivable by said motor, and throw rods engaged between said shaft and the two sections whereby a rotational driving of said shaft will effect a relative extension and retraction of the throw rods and a corresponding movement of the sections.

8. In a fruit harvester, a picking unit, said picking unit comprising a pair of generally vertical coplanar picking head sections, means for effecting a lateral movement of at least one of said head sections relative to the other of said head sections and in the common plane thereof, each of said sections including a plurality of elongated rodlike picking fingers thereon, said picking fingers being arranged in a plurality of vertically spaced horizontal rows, the horizontal rows of fingers on each head section alternating with and overlapping the horizontal rows on the other head section whereby, upon a lateral movement of one head section, and picking fingers thereon, relative to the other head section and picking fingers, a snapping of fruit stems received between the fingers of the two head sections will be effected.

9. The construction of claim 8 wherein both of said picking head sections are mounted for movement, said means for effecting a lateral movement of at least one of said head sections simultaneously effecting a movement of the second head section.

10. The construction of claim 9 wherein each horizontal row of rodlike picking fingers on each head section is mounted on an individual horizontal rigid bar, the rigid bars of each head section being rigidly interconnected by vertical members, each picking head section including substantially more than two rows of picking fingers to define an enlarged fruit accommodating pattern.

11. A fruit harvester comprising a rigid mounting frame, a pair of generally vertical adjacent picking head sections, means mounting said picking head sections on said frame for reciprocal movement relative to each other and to said frame, means for reciprocally moving said head sections in synchronization, each of said picking head sections including several vertically spaced horizontal rows of picking fingers, said picking fingers projecting laterally outward of the corresponding head sections for picking engagement with fruit upon a movement of the head sections, the horizontal rows of fingers of each head section alternate with the rows of fingers on the other head section and extend in generally free overlying relation to the other head section between the rows thereof.

References Cited
UNITED STATES PATENTS

| 3,337,071 | 8/1967 | Clark | 56—328X |
| 3,347,587 | 10/1967 | Frost | 56—328X |
| 3,389,543 | 6/1968 | Clark | 56—337 |
| 3,451,202 | 6/1969 | Murray | 56—328 |

LOUIS G. MANCENE, Primary Examiner

J. N. ESKOVITZ, Assistant Examiner